United States Patent [19]

Yamaguchi et al.

[11] Patent Number: 4,756,960
[45] Date of Patent: Jul. 12, 1988

[54] ABRASIVE TAPE

[75] Inventors: Nobutaka Yamaguchi; Eiichi Tadokoro, both of Odawara, Japan

[73] Assignee: Fuji Photo Film Co., Ltd., Japan

[21] Appl. No.: 920,164

[22] Filed: Oct. 17, 1986

[30] Foreign Application Priority Data

Oct. 18, 1985 [JP] Japan .................. 60-232501

[51] Int. Cl.$^4$ .................................. G11B 5/702
[52] U.S. Cl. .................. 428/323; 428/329; 428/336; 428/694; 428/900
[58] Field of Search .......... 428/323, 329, 694, 900, 428/336

[56] References Cited

U.S. PATENT DOCUMENTS 4,515,857 5/1985 Kitamoto et al. .................. 428/900
4,539,266 9/1985 Miyazaki .......................... 428/900
4,546,038 10/1985 Yamaguchi et al. ............... 428/900

FOREIGN PATENT DOCUMENTS 53-102017 9/1978 Japan .

Primary Examiner—Paul J. Thibodeau
Attorney, Agent, or Firm—Gerald J. Ferguson, Jr.; Michael P. Hoffman

[57] ABSTRACT

An abrasive tape comprises a flexible non-magnetic substrate, and an abrasive coating film essentially consisting of an abrasive material, a binder and an additive kneaded together and applied onto the flexible non-magnetic substrate. The abrasive material has a Mohs hardness of 6 or higher, and the binder essentially consists of a vinyl chloride-vinyl acetate copolymer, a prepolymer having an isocyanate group at a terminal, and an organic amine.

3 Claims, 1 Drawing Sheet

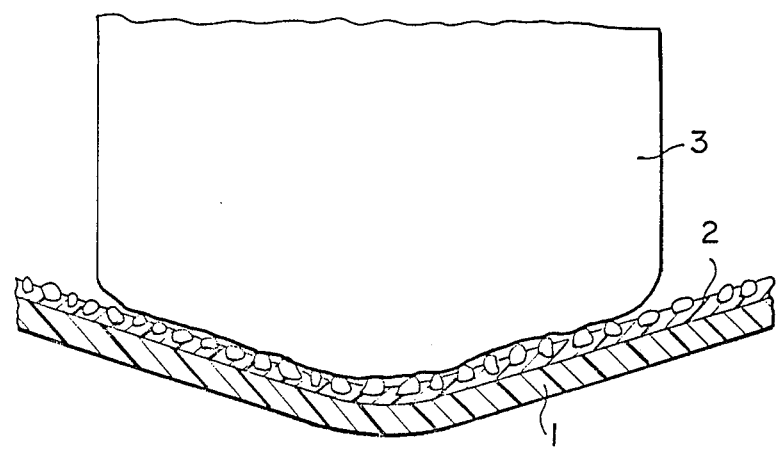

ABRASIVE TAPE

BACKGROUND OF THE INVENTION

1. Field of the Invention

This invention relates to an abrasive tape for use in accurate polishing of a magnetic head for a magnetic recording and reproducing apparatus. This invention particularly relates to an abrasive tape for use in smooth finishing of a video magnetic head or a high grade audio magnetic head.

2. Description of the Prior Art

Video or high grade audio magnetic heads are required to have very smooth tape sliding surfaces. Therefore, in general, in the process of making the magnetic head, the tape sliding surface is given a smooth finish by use of an abrasive tape after rough grinding. The abrasive tape comprises a flexible non-magnetic substrate and fine abraisve particles or the like coated thereon, and can accurately polish the tape sliding surface of the magnetic head by snugly fitting to the curved shape thereof.

As the abrasive tape, there has heretofore been known, for example, a cleaning tape as disclosed in Japanese Unexamined Patent Publication No. 53(1978)-102017, which comprises a substrate, and a mixture of an abrasive material consisting of zinc oxide (ZnO) or the like with a binder consisting of a vinyl chloride-vinyl acetate copolymer or the like kneaded together and coated onto the substrate.

However, the purpose of the aforesaid tape is mainly to remove dust or the like from the magnetic head. Since zinc oxide or the like having a Mohs hardness within the range of approximately 4 to 5 is used as the abrasive material for satisfying the purpose, the hardness of the abrasive material is too low to satisfy the requirements of the tape for polishing the magnetic head.

Also, the conventional binder using a vinyl chloride-vinyl acetate copolymer or the like is not so much flexible. Therefore, with the abrasive tape using such a binder, it is impossible to substantially polish a curved portion of the magnetic head, and therefore it is not always possible to improve the characteristics of the video or high grade audio magnetic head which is required to exhibit high sensitivity and a high S/N ratio.

SUMMARY OF THE INVENTION

The primary object of the present invention is to provide an abrasive tape which polishes a magnetic head uniformly and substantially.

Another object of the present invention is to provide an abrasive tape which provides a magnetic head exhibiting excellent characteristics.

The present invention provides an abrasive tape comprising a flexible non-magnetic substrate, and an abrasive coating film essentially consisting of an abrasive material, a binder and an additive kneaded together and applied onto said flexible non-magnetic substrate, wherein said abrasive material has a Mohs hardness of 6 or higher, and said binder essentially consists of a vinyl chloride-vinyl acetate copolymer, a prepolymer having an isocyanate group at a terminal, and an organic amine.

The abrasive tape broadly embraces long strip-like form, a disk-like form and a sheet-like form.

With the abraisve tape in accordance with the present invention, since the hard abrasive material having a Mohs hardness of 6 or higher is used, it is possible to reliably polish the tape sliding surface of the magnetic head. Also, since the binder which is not too hard though it is of a curing system is formed by a vinyl chloride-vinyl acetate copolymer which is a comparatively hard binder, a prepolymer having an isocyanate group at a terminal which is a soft binder, and an organic amine as a curing agent, the abrasive tape exhibits flexibility higher than with the conventional coating layer, and is suitable for substanially polish the whole surface of the tape sliding surface of the magnetic head by snugly fitting thereto.

Accordingly, the magnetic head subjected to abrasive finishing by use of the abrasive tape in accordance with the present invention substanially satisfies excellent characteristics required for video or high grade audio magnetic heads.

BRIEF DESCRIPTION OF THE DRAWING

The single drawing is an enlarged sectional view showing an embodiment of the abrasive tape in accordance with the present invention in the use state for polishing a magnetic head.

DESCRIPTION OF THE PREFERRED EMBODIMENTS

The present invention will hereinbelow be described in further detail with reference to the accompanying drawing.

As shown in the drawing, an embodiment of the abrasive tape in accordance with the present invention comprises a non-magnetic substrate 1, and a coating layer 2 overlaid on the substrate 1. The coating layer 2 is formed of an abrasive material, a binder and an additive kneaded together. The abrasive material comprises hard abrasive particles having a Mohs hardness of 6 or higher. The binder essentially consists of a vinyl chloride-vinyl acetate copolymer, a prepolymer having an isocyanate group at a terminal, and an organic amine.

The tape sliding surface of a magnetic head 3 is polished smoothly by the hard abrasive particles. The particle sizes of the abrasive particles may be adjusted in accordance with the purpose, and may be within the range of approximately 16 μm to 1 μm for rough finishing, and within the range of approximately 1 μm to 0.1 μm for regular finishing. The material of the abrasive particles may be $Cr_2O_3$, $Al_2O_3$, carborundum, diamond or the like. The binder for dispersing the abrasive particles is prepared by mixing a vinyl chloride-vinyl acetate copolymer which is a comparatively hard binder, a prepolymer having an isocyanate group at a terminal which is a soft binder, with an organic amine as a curing accelerator at appropriate ratios. Though the binder thus prepared is of a curing system exhibiting heat resistance and solvent resistance, it exhibits flexibility higher than with the conventional binder. Therefore, it becomes possible to snugly fit the abrasive tape to the curved surface shape of the magnetic head 3. The vinyl chloride-vinyl acetate copolymer may be, for example, vinyl chloride-vinyl acetate-vinyl alcohol, or vinyl chloride-vinyl acetate-maleic acid, wherein vinyl alcohol or maleic acid as a third constituent is bonded to vinyl chloride-vinyl acetate. When the third constituent is bonded to vinyl chloride-vinyl acetate, it becomes possible to enhance the property of dispersing the abrasive particles and to prevent polishing nonuniformity of the magnetic head 3 which has heretofore arisen due to partial agglomeration of the abrasive particles. As the prepolymer having an isocyanate group at a terminal, it is possible to use, for example, Takenate L-1007, Takenate L-1307, Takenate L-2710, or Takenate L-6001 supplied by Takeda Yakuhin Kogyo K.K.; Coronate 4706, Coronate 4080, or Coronate 4096 supplied by Nihon Polyurethane K.K.; or Hiprene L-320 or Hiprene U-51 supplied by Mitsui Nisso Urethane K.K. As the organic amine, it is possible to use, for example, Amine T supplied by Anchor Chemical; or Epodite K-20 or K-40 supplied to Kobunshi Kagaku Kogyo K.K. As the aromatic amine, it is possible to use, for example, Cuamine supplied by Ihara Chemical Kogyo K.K.; Epodite K-52 supplied by Kobunshi Kagaku Kogyo K.K.; Curing Agent DDM supplied by Anchor Chemical; or Epomate B, C or S supplied by Ajinomoto K.K. which is a modified amine type curing agent having heterocyclic diamine as the skeleton.

The mixing ratios among the three constituents of the binder should be adjusted so that substantial dispersing effects on the abrasive particles are obtained and high flexibility is obtained substantially. Thus the ratio of the vinyl chloride-vinyl acetate copolymer should preferably be within the range of 30% to 70% by weight, the ratio of the prepolymer having an isocyanate group at a terminal should preferably be within the range of 20% to 60% by weight, and the ratio of the organic amine should preferably be within the range of 1% to 10% by weight.

As the additive, it is possible to use a dispersing agent, a lubricating agent, a filler, or the like.

As the material of the non-magnetic substrate 1, it is possible to a polyester such as polyethylene terephthalate (PET), or polyethylene-2, 6-naphthalate; a polyolefin such as polyethylene, or polypropyrene; or a cellulose derivative such as cellulose diacetate, cellulose triacetate, cellulose acetate butyrate, or cellulose acetate propionate.

If the thickness of the coating layer 2 is too large, contact of the abrasive tape with the magnetic head becomes bad, depending on the shape and material of the magnetic head 3. Therefore, the thickness of the coating layer 2 should preferably be not larger than 50 μm.

The present invention will further be illustrated by the following nonlimitative example.

EXAMPLE

An abrasive tape 1 was prepared by applying a coating composition as shown below onto a 25 μm-thick polyethylene terephthalate (PET) substrate. The parts in the following descriptions are parts by weight. Coating composition:

| | |
|---|---|
| $\gamma$-Fe$_2$O$_3$ | 300 parts |
| (Size: 1.0 μm × 0.1 μm × 0.1 μm) | |
| Al$_2$O$_3$ | 150 parts |
| (Size: 0.6 μm diameter, Mohs hardness: 9) | |
| Vinyl chloride-vinyl acetate-vinyl alcohol copolymer | 80 parts |
| (Eslec A supplied by Sekisui Kagaku Kogyo K.K.) | |
| Isocyanate-terminated prepolymer | 60 parts |
| (Takenate L-1007 supplied by Takeda Yakuhin Kogyo K.K.) | |
| Organic amine | 5 parts |
| (Cuamine M supplied by Ihara Chemical Kogyo K.K.) | |
| Oleic acid | 15 parts |
| Amyl stearate | 5 parts |
| Carbon black | 30 parts |
| (Particle size: 20 μm) | |
| Butyl acetate | 900 parts |

In a Comparative Example, an abrasive tape 2 was prepared by applying a coating composition as shown below onto a substrate approximately similar to that in the aforesaid Example. The sample obtained by this Comparative Example is the same as Sample No. 24 disclosed in Japanese Unexamined Patent Publication No. 53(1978)-102017.

Coating Composition:

| | |
|---|---|
| ZnO | 300 parts |
| (Size: 120 μm diameter, Mohs hardness: 4.5) | |
| Vinyl chloride-vinyl acetate copolymer | 34.7 parts |
| (Copolymerization ratio: 87:13, polymerization degree: 350) | |
| Polyester polyol | 21 parts |
| (reaction product of 1 mol of adipic acid, 1 mol of diethylene glycol, with 0.06 mol of trimethylolpropane; viscosity at 75° C.: 1,000 CP, specific gravity: 1.18, OH value: 60, acid value <2) | |
| Soybean lecithin | 2.4 parts |
| Silicone oil (dimethyl polysilocane) | 0.1 part |
| Polyisocyanate | 18 parts |
| (75 wt % ethyl acetate solution of a reaction product of 3 mols of 2,4-tolylene diisocyanate compound with 1 mol of trimethylolpropane) | |
| Methyl ethyl ketone | 400 parts |
| Toluene | 400 parts |

For the abrasive tapes of the Example and the Comparative Example, the head polishing time and generation of scratches on the head surface after the polishing were investigated. The results were as shown in the following table.

| | Head polishing time | Scratch on head surface |
|---|---|---|
| Example | Approx. 10 sec. | None |
| Comparative Example | Approx. 5 min. | Many scratches |

In this table, the head polishing time was the time required for polishing the ferrite head by 1 μm. As for the scratches on the head surface, scratches having a width of 2 μm or larger were investigated by microscopic observation of the gap surface of the magnetic head after the polishing.

As is clear from the aforesaid table, it is possible with this embodiment to markedly shorten the head polishing time, and to minimize the scratching on the magnetic head surface due to the polishing.

We claim:

1. An abrasive tape comprising a flexible non-magnetic substrate and an abrasive coating film essentially consisting of an abrasive material, a binder and an additive kneaded together and applied onto said flexible non-magnetic substrate wherein said abrasive material has a Mohs hardness of 6 or higher and said binder essentially consists of a vinyl chloride-vinyl acetate copolymer, a prepolymer having an isocyanate group at a terminal, and an organic amine, wherein said binder consists essentially of said vinyl chloride-vinyl acetate copolymer at a ratio within the range of 30% and 70% by weight with respect to the total weight of said binder, said prepolymer having an isocyanate group at a terminal at a ratio within the range of 20% to 60% by weight with respect to the total weight of said binder and said organic amine at a ratio within the range of 1% to 10% by weight with respect to the total weight of said binder, and wherein said abrasive coating film has a thickness not larger than 50 μm.

2. An abrasive tape as defined in claim 1 wherein said vinyl chloride-vinyl acetate copolymer is a vinyl chloride-vinyl acetate-vinyl alcohol copolymer.

3. An abrasive tape as defined in claim 1 wherein said vinyl chloride-vinyl acetate copolymer is a vinyl chloride-vinyl acetate-maleic acid copolymer.

* * * * *